United States Patent [19]
Okamoto et al.

[11] Patent Number: 6,001,148
[45] Date of Patent: Dec. 14, 1999

[54] PROCESS FOR OBTAINING METAL FROM METAL OXIDE

[75] Inventors: Tetsuo Okamoto, Chita; Hideharu Sakai, Nagoya, both of Japan

[73] Assignee: Daido Steel Co., Ltd., Nagoya, Japan

[21] Appl. No.: 08/852,296

[22] Filed: May 7, 1997

[30] Foreign Application Priority Data

May 16, 1996 [JP] Japan .................................. 8-146636

[51] Int. Cl.⁶ .......................... C21B 11/10; C22B 34/32
[52] U.S. Cl. .................. 75/10.15; 75/10.18; 75/10.62; 75/10.63; 75/454; 75/502; 75/623
[58] Field of Search ...................... 75/502, 623, 10.15, 75/10.18, 10.62, 10.63, 454, 455, 456

[56] References Cited

U.S. PATENT DOCUMENTS

| | | | |
|---|---|---|---|
| 1,715,155 | 5/1929 | Westberg | 75/454 |
| 3,264,096 | 8/1966 | Agarwal et al. | 75/455 |
| 5,480,474 | 1/1996 | Ulrich | 75/502 |
| 5,702,502 | 12/1997 | Kundrat et al. | 75/623 |

*Primary Examiner*—Melvyn Andrews
*Attorney, Agent, or Firm*—Kubovcik & Kubovcik

[57] ABSTRACT

A process for producing metals in the reduced state from their oxides using a simple and less expensive facility with lower running cost. A metal oxide in the form of particles is supplied into a high temperature flame from an oxygen burner in a reactor furnace to heat and melt the metal oxide. A reducing agent is also supplied into the flame to cause a reducing reaction of the molten metal oxide with the reducing agent. The resulting metal is recovered.

12 Claims, 5 Drawing Sheets

PROCESS FOR OBTAINING METAL FROM METAL OXIDE

BACKGROUND OF THE INVENTION

1. Field in the Industry

This invention concerns a process for obtaining a metal from a metal oxide as a reduced form. More specifically, the invention concerns a process in which a metal oxide is pulverized and the resulting particles are heated by high temperature flame and melted to carry out reducing reactions.

2. State of the Art

In conventional steel making using an electric furnace dust waste from the furnace is collected by a dust collector for the purpose of preventing air pollution.

The dust as a waste from steel making is very fine powder, and because of difficulty in utilization thereof, even though it contains FeO and $Fe_2O_3$, the dust has been disposed as it is.

The steelmaking using an electric furnace also exhausts as wastes oxidation slag and reduction slag depending on the steps of refining.

Of the wastes, the oxidation slag is used as a roadbed material for constructing asphalt-paved roads. On the other hand, the reduction slag has no particular use, and thus, it is unavoidable to dispose.

The reduction slag contains, as one of the components, much free CaO, which absorbs water to be $Ca(OH)_2$. Volume expansion occurring at the time of this hydration makes it difficult to use the reduction slag as it is even for the roadbed material.

Disposing these dusts of course requires much cost, and the cost for disposing increases the costs for steel making.

The applicant proposed in a previous patent application (Japanese Patent Application No.6-11208) a method of mixing the steel making dust and the reduction slag by injecting them from nozzles of a burner into high temperature flame to melt.

This method gives the reduction slag physical and chemical properties similar to those of the oxidation slag, and thus, makes it possible to use the waste as the roadbed material.

SUMMARY OF THE INVENTION

The object of the present invention is to provide a process for obtaining a metal from a metal oxide as a reduced form. The process has been accomplished by developing the above noted knowledge that the steel making dust which mainly comprises iron oxides can be easily melted by releasing it in the form of particles in a high temperature flame The process of the present invention for obtaining a metal from a metal oxide is characterized in that a metal oxide is pulverized and the resulting metal oxide particles are supplied into a high temperature flame from a burner in a reactor furnace so as to heat and melt the metal oxide particles, and that a reducing agent is also supplied into the reactor furnace so as to reduce the metal oxide and obtain the metal.

DETAILED EXPLANATION OF THE PREFERRED EMBODIMENTS

Figure 1:
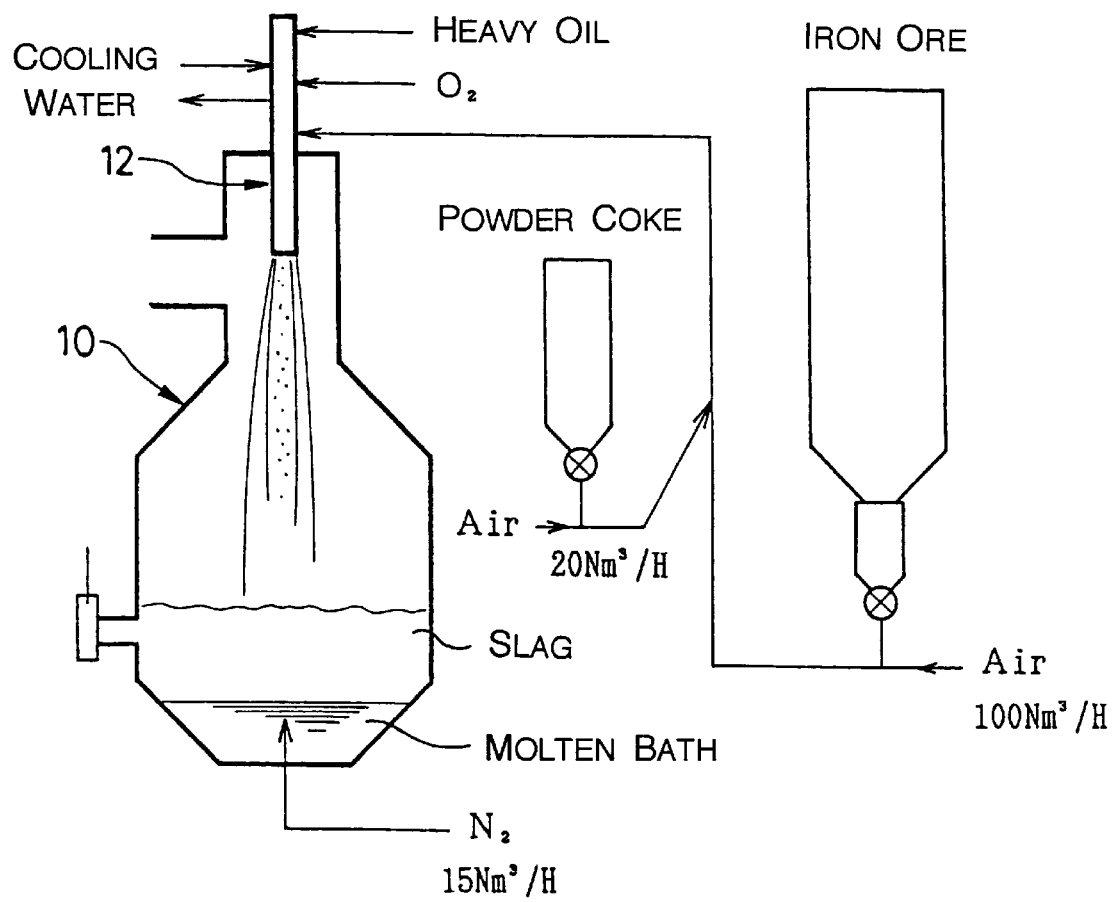
FIG. 1 is a schematic diagram of a facility used in an example of the present invention.

In the present invention, because the metal oxide is supplied into the flame as fine particles having large surface area, it is easy to heat and melt them with the flame and thus, reaction with the reducing agent will proceed. As the result, metals or the products of deoxidation, can be obtained with high yields.

Facilities for carrying out the present process including the above noted reducing reaction is simple, and therefore, may comprise low-cost equipment. Running cost is also low and thus, a metal as the reduced state can be obtained from a metal oxide with reduced costs.

In a preferable embodiment of the present invention iron oxide is used as a metal oxide and thus, metal iron is obtained by the above described process.

Iron ore may be used as the iron oxide and thus, metal iron in the reduced state is obtained by the above reaction.

In this embodiment, the iron ore is pulverized and the resulting iron ore particles are supplied into the reactor furnace. Heating and melting the particles may be easily carried out with the flame from the burner and the above reducing reaction proceeds smoothly.

In the present process not only pulverized lump iron ore but also iron ore in the form of powder may of course be conveniently used. Use of iron ore of this powder form reduces costs for pulverizing and further, makes it possible to effectively utilize powdery or fine powdery ore which shares majority of iron ore.

In the present invention, dust waste from steel making may be used as the iron oxide and thus, useful metal iron is easily obtained from the dust which has been regarded useless and wasted.

It is possible to use the iron oxide of other forms such as mill scale, sludge and the like.

In addition to the above described case of using iron oxide as the metal oxide it is also possible to use chromium ore as the metal oxide. The ore is pulverized and supplied into the high temperature flame from the burner so as to cause reducing reaction with the reducing agent to form metal of reduced state.

In this case not only particles of pulverized lump chromium ore but also powder chromium ore may of course be conveniently used. Use of chromium ore of this powder form reduces cost for pulverizing and further, makes it possible to effectively utilize powdery or fine powdery ore which shares majority of iron ore.

The present invention is applicable to production of other metals from corresponding metal oxide inclusive of production of metal nickel by using nickel ore as the metal oxide.

As the above mentioned burner an oxygen burner or an oxygen-enriched gas burner may conveniently used.

Also in the present invention the particles of the metal oxide may be supplied by being injected from the nozzles of the burner into the high temperature flame along the axis of the flame for heating and melting.

In this embodiment the burner is utilized as a means for supplying the metal oxide into the reactor furnace, and use of the burner makes it possible to release the metal oxide particles certainly and directly into the flame, and to maintain the metal oxide particles for a long period because the metal oxide particles are injected in the direction of flame axis. Thus, this process requires much more simple facilities, and makes it possible to efficiently melt the metal oxide.

As the burner fuel various kinds of fuel such as heavy oil, fine coal powder and natural gas can be used. Of the coal powder general coal powder, which is produced in large quantities and contains much volatile components, can be conveniently used.

The reducing agent may be supplied through the side wall of the reactor furnace separately to the metal oxide particles. In an alternative, the reducing agent in the powder form may be directly supplied into the flame from the top of the burner.

In the latter embodiment it is not necessary to provide supply means at the furnace wall, and the burner itself can be used as the means for supplying the reducing agent. Thus, the facilities will be simpler and the injected reducing agent will effectively contact the metal oxide in the high temperature flame so that the reducing reaction may proceed.

In the above embodiment of directly injecting the reducing agent the particles of the reducing agent should be such sizes that they do not completely burn out in the high temperature flame.

In an alternative of the present invention the reducing agent may be previously mixed with the molten metal. The molten mixture is charged into the reactor furnace and the reducing agent is thus supplied to the furnace.

In a further alternative a reducing agent may be directly blown into the molten metal oxide bath by a carrier gas. This makes it possible not only to prevent scattering of the reducing agent into gas phase but also to stir the molten metal oxide bath with the carrier gas so that the reducing reaction may be efficiently carried out.

The above described methods of supplying the reducing agent may be carried out in any combination thereof.

The reducing agent used in the present invention may be not only solid particles such as powdered coke, powdered coal and aluminum ash, but also liquid fuel such as heavy oil.

In an embodiment of the present process the ratio of the oxygen to the fuel supplied to the burner is so adjusted that the oxygen is insufficient for complete burning of the fuel for forming a reducing flame rich in CO so as to accelerate the reducing reaction under the reducing atmosphere. In this case reducing reaction of the metal oxides may be carried out more smoothly and further, the amount of the reducing agent to be charged in the furnace may be decreased and thus, production costs could be lowered.

It is preferable to blow a stirring gas into the molten bath in the reactor furnace so as to accelerate the reducing reaction and achieve higher yield of metal product. As the stirring gas it is possible to use, in addition to inert gases such as $N_2$ and Ar, reducing gases such as $CH_4$, $H_2$ and CO. Use of the reducing gas as the stirring gas accelerates the above mentioned reducing reaction.

In the present invention heat necessary for the reducing reaction is basically supplied by flame of the burner. Optionally, however, other heating means such as arc heating, induction heating and reaction heat of CO in the molten bath can be used in addition to the burner heating.

EXAMPLES

The following illustrates working examples of this invention.

Example 1A

In FIG. 1, numerical reference 10 shows the furnace body, on which an oxygen burner 12 is installed in such a position that the flame goes downward.

Figure 2:
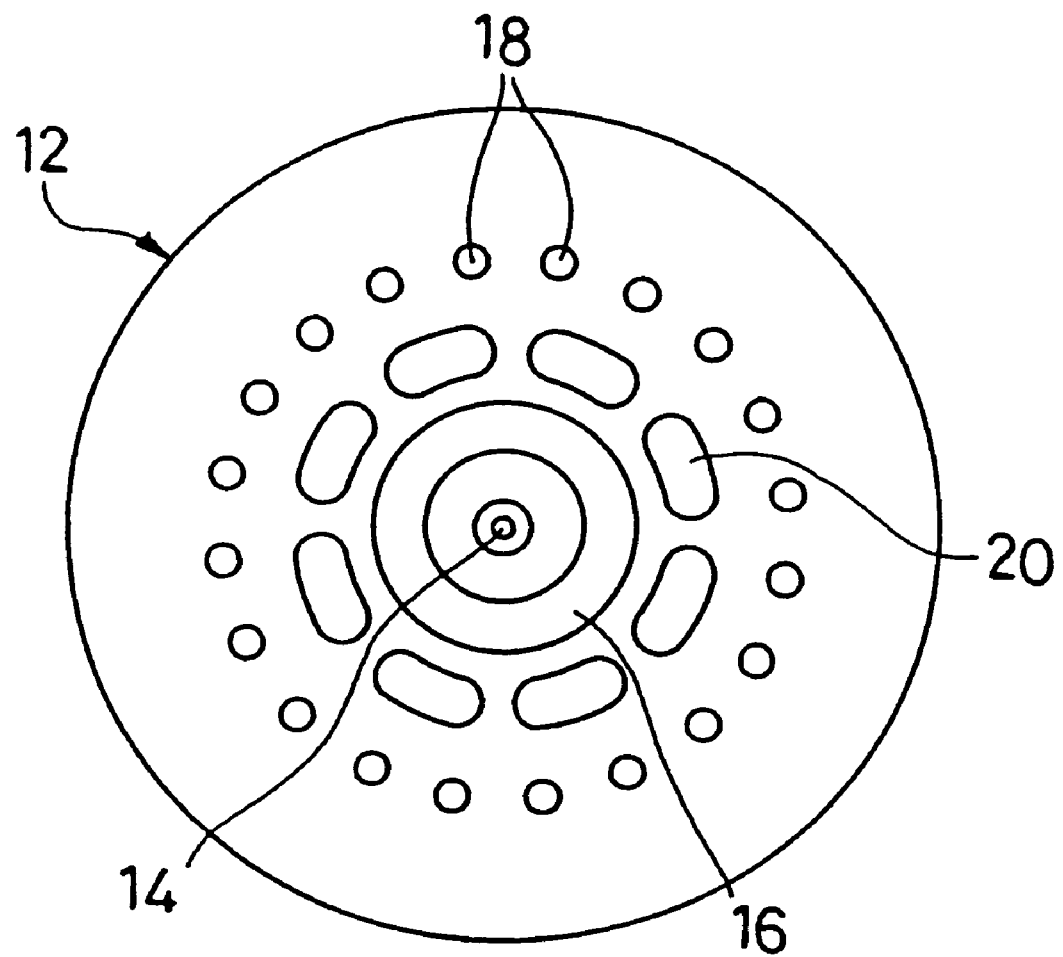
FIG. 2 illustrates essential parts of the oxygen burner shown in FIG. 1.

As shown in FIG. 2, the oxygen burner 12 has a nozzle 14 for fuel at the center of the top face; a slit nozzle 16 surrounding this center nozzle for primary oxygen; nozzles 20 for injecting particles in outer locations; and nozzles 18 for secondary oxygen at further outer or the outermost circumferencial positions; all the nozzles being positioned concentrically.

Iron ore having the composition shown in Table 1 was pulverized to such powder that fine particles under 150 mesh share 90%. The particles were supplied to the oxygen burner 12 by using air as a carrier gas. Coke particles of diameters 2–5 mm were supplied at the same time to the oxygen burner 12 by using also air as a carrier gas.

TABLE 1

| Components | $Fe_2SO_3$ (T.Fe) | $SiO_2$ | $Al_2O_3$ | $H_2O$ |
|---|---|---|---|---|
| wt. % | 90 (63) | 5.1 | 2.3 | 2.0 |

The reason why such large particles of coke as 2–5 mm were used is that, when the coke particles are injected into the flame from the oxygen burner 12, the coke particles may not completely burn out in the flame and a major portion may be utilized as the reducing agent.

To the oxygen burner 12 heavy oil as fuel and oxygen $O_2$ were supplied at the same time and injected through the respective nozzles 14, 16 and 18 into the furnace so as to form a high temperature flame in the furnace. Further, a mixture of iron ore powder (powder ore) and coke particles were injected into the flame for melting the iron ore powder to cause the reducing reaction.

The amounts of supplied materials and fuels are as shown in Table 2 below:

TABLE 2

| Heavy Oil | 800 liters/hour |
| $O_2$ | 1600 $Nm^3$/hour |
| Pulverized Iron Ore | 2.8 T/hour |
| Coke Powder | 0.75 T/hour |

The amounts of the supplied heavy oil and oxygen were such that complete combustion of the heavy oil occurs.

Prior to the above operation CaO 400 kg and $CaF_2$ 100 kg were charged into the furnace 10, and the furnace was preheated prior to use for 4 hours. Air as the carrier gas for the iron ore powder was supplied at the rate of 100 $Nm^3$/Hr, and air as the carrier gas for the coke, at the rate of 20 $Nm^3$/Hr. During the reducing reaction $N_2$ gas was blown out from the furnace bottom as a stirring gas at the rate of 15 $Nm^3$/Hr.

After 1 hour of the above operation molten slag and molten steel were separately tapped. Temperature of the molten steel was 1540° C. and the amount of the obtained steel was 1.66 T. The steel contained carbon 0.4%. Temperature of the exhaust gas was measured to be 1580° C. On the other hand, amount of the slag was 0.73 T, and the chemical composition was analyzed as shown in Table 3.

TABLE 3

| Components | T.Fe | CaO | SiO$_2$ | Al$_2$O$_3$ | MgO |
|---|---|---|---|---|---|
| wt. % | 2.5 | 65 | 20 | 8 | 2 |

Based on the above results recovery percentage of Fe from Fe$_2$O$_3$ was calculated to be 94%.

According to mass-balance of the molten steel, 0.08 T of the steel is not found and this amount seems to be in the dust and splash remained in the furnace 10.

Example 1B

The above described operation was repeated with the exception that the amounts of heavy oil and oxygen were 850 liters/Hr and 1500 m$^3$/Hr, respectively, i.e., such ratio that heavy oil does not completely burn. Supplied coke particles were so decreased as to be less than in the above example or 0.65 T/Hr.

The amount of the molten steel finally obtained was 1.69 T with loss of 0.07 T steel in the dust and the splash remained in the furnace 10.

Chemical composition of the slag was as follows: total Fe 2.0%, CaO 66%, SiO$_2$ 22%, Al$_2$O$_3$ 6% and MgO 2%.

Example 2

Figure 3:
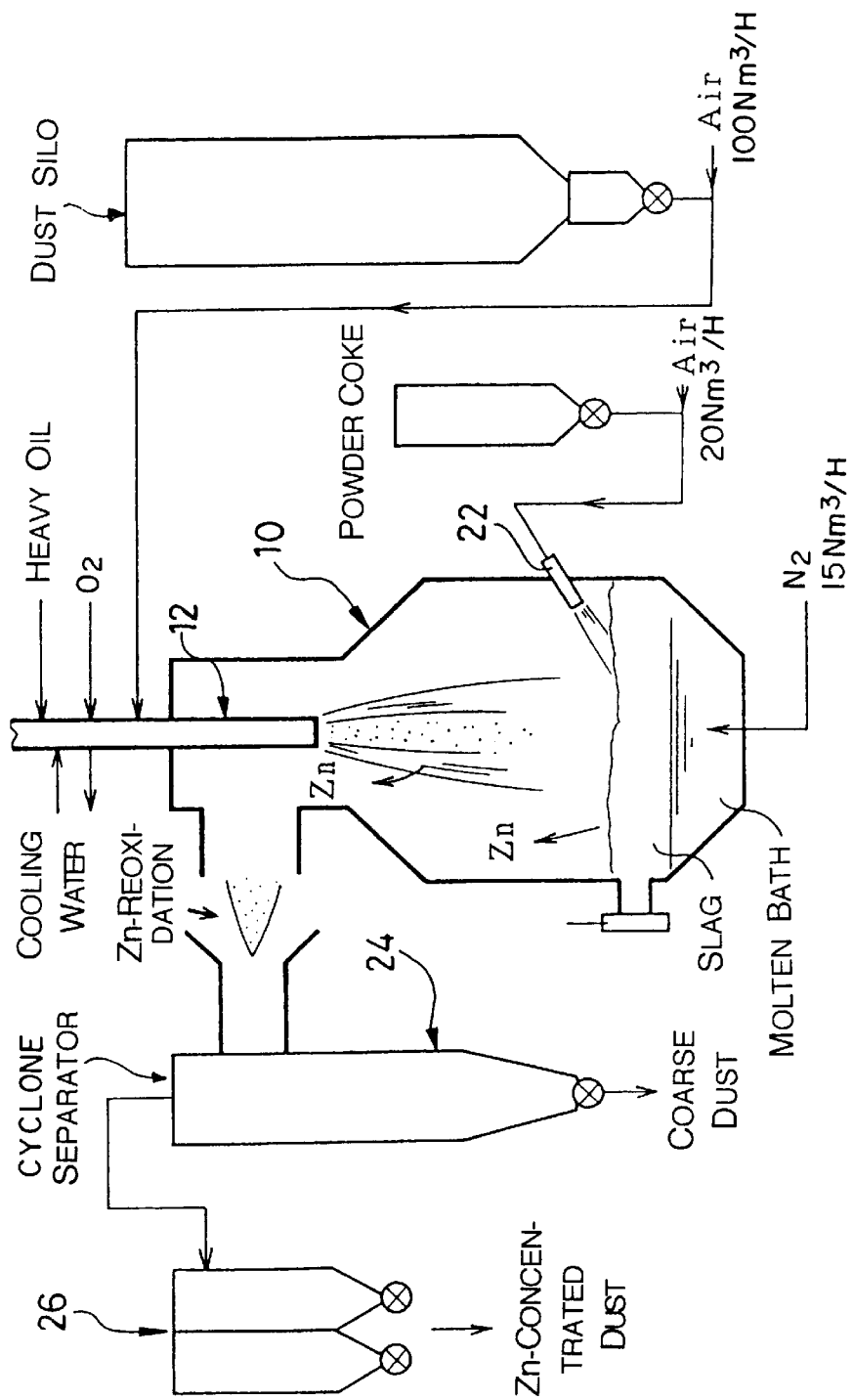
FIG. 3 is a schematic diagram of another facility used in another example of the present invention.

Using the apparatus illustrated in FIG. 3 arc-furnace dust of a chemical composition as shown in Table 4 was melted and reduced.

TABLE 4

| Components | Fe$_2$SO$_3$ (T.Fe) | SiO$_2$ | Al$_2$O$_3$ | CaO | ZnO | PbO |
|---|---|---|---|---|---|---|
| wt. % | 59 (41.3) | 5.2 | 3.0 | 4.8 | 18 | 2.8 |

The dust was fine powder as shown in Table 5.

TABLE 5

| Particle Size ($\mu$) | less than 1 | 1–5 | 5–10 | over 10 |
|---|---|---|---|---|
| % | 49 | 36 | 7 | 8 |

In this example, after charging CaO 400 kg and CaF$_2$ 100 kg and preheating the furnace 10, heavy oil, O$_2$ and arc furnace dust were injected under the conditions shown in Table 6 below through the oxygen burner 12 into the furnace 10 so as to melt the arc furnace dust with the high temperature flame from the oxygen burner 12. At the same time coke particles were thrown to the center of the furnace from nozzle 22 installed through the wall of the furnace. Also, N$_2$ gas was blown into the bottom of the furnace to stir the molten bath.

TABLE 6

| Heavy Oil | 900 liters/hour |
|---|---|
| O$_2$ | 1600 Nm$^3$/hour |
| Arc-Furnace Dust | 3.0 T/hour |
| Powdered Coke | 0.48 T/hour |

The coke particles used in this example had diameters of 0.1–2 mm. Oxygen supply was so made to be 89% of the amount necessary for complete burning of the heavy oil. The reason why the oxygen supply was decreased to less than that necessary for complete burning of the heavy oil is as follows. ZnO contained in the dust in an amount of 18% may be easily reduced at a high temperature and in CO gas atmosphere.

This was ascertained by the preliminary experiments described below.

In the experiments where only melting was done without charging coke powder through nozzle 22, the amounts of ZnO in the molten slag were:

in case that O$_2$ is equivalent to heavy oil ZnO %=9, and in case that O$_2$ is 89% of equivalent amount ZnO %=2.

The data shows that considerable amount of ZnO is reduced in the CO atmosphere of the flame. Zn reduced here is in the vapor phase at this temperature and the exhausted with exhaust gas. It is re-oxidized at the position of air introduction.

Thus, a decrease of oxygen supply makes it possible to accelerate reduction of ZnO in the flame from oxygen burner 12. As the result, the amount of coke powder for the reducing reaction to be charged through nozzle 22 can be diminished, and the cost can be lowered consequently.

The above operation continued one hour, and then the resulting molten slag and molten mental were separately tapped. Temperature of the molten steel was 1580° C. and the amount of the molten steel was 1.18 T. Content of carbon in the steel was 0.4%, and contents of ZnO and PbO were both up to 0.1%.

Chemical composition of the slag is as shown in Table 7. The slag amounted to 1.02 T.

TABLE 7

| Components | T.Fe | CaO | SiO$_2$ | Al$_2$O$_3$ | ZnO | PbO |
|---|---|---|---|---|---|---|
| wt. % | 2.2 | 63 | 18 | 10 | 0.1 | <0.01 |

In this example secondary dust entrained by exhaust gas from the furnace 10 was collected by passing the gas in a cyclone separator 24 and then, a bag filter 26. The reason why the secondary dust was passed through the cyclone separator 24 is to catch coarse particles in the dust so that ZnO which is in the form of fine powder may be concentrated in the bag filter 26. ZnO concentration in the secondary dust collected by the bag filter 26 was 58%. This could be used as recovered ZnO.

Example 3

Chromium ore of the chemical composition shown in Table 8 was pulverized to powder in which particles finer than 200 mesh share 92%.

TABLE 8

| Components | Cr$_2$O$_3$ (T.Cr) | FeO (T.Fe) | MgO | Al$_2$O$_3$ | C |
|---|---|---|---|---|---|
| wt. % | 46 (31.5) | 26 (20.2) | 10 | 16 | 0.02 |

Figure 4:
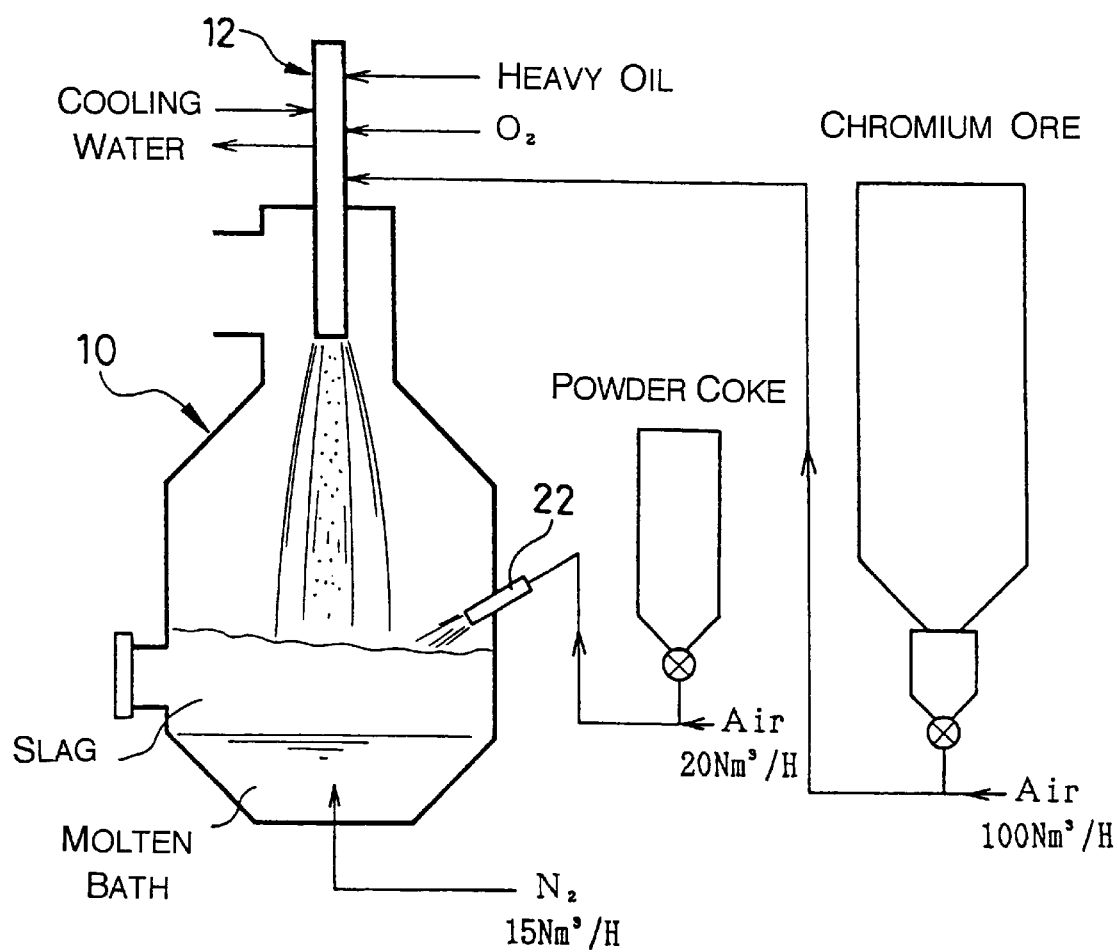
FIG. 4 is a schematic diagram of a still other facility used in a still other example of the present invention.

Using the apparatus illustrated in FIG. 4, after charging CaO 600 kg and CaF$_2$ 150 kg and preheating the furnace, the particles of the chromium ore were injected from the oxygen burner 12 to melt under the conditions shown in Table 9 below. Coke powder was also thrown from nozzle 22 installed through the furnace wall to the center of the furnace. At the same time N$_2$ gas was bubbled from the furnace bottom to stir the molten bath.

TABLE 9

| Heavy Oil | 800 liters/hour |
|---|---|
| O$_2$ | 1600 Nm$^3$/hour |
| Powder Ore | 2.5 T/hour |
| Powdered Coke | 0.52 T/hour |

The coke powder used had diameters of 0.1–2 mm. Supply ratio of the heavy oil and O$_2$ was such that the heavy oil completely burns.

The above operation continued for one hour to melt and reduce the powder ore, and then the molten slag and the molten metal were separately tapped. Temperature of the molten metal was 1580° C. and the amount of the molten metal was 1.15 T. Chemical composition of the metal was as shown in Table 10.

TABLE 10

| Components | Cr | Fe | C |
|---|---|---|---|
| wt. % | 58 | 39 | 1.2 |

On the other hand, the slag amounted to 1.44 T, with the chemical composition as shown in Table 11. Temperature of the exhaust gas was 1510° C.

TABLE 11

| Components | Cr$_2$O$_3$ | T.Fe | CaO | MgO | Al$_2$O$_3$ |
|---|---|---|---|---|---|
| wt. % | 2.6 | 0.5 | 53 | 17 | 25 |

Example 4

Figure 5:
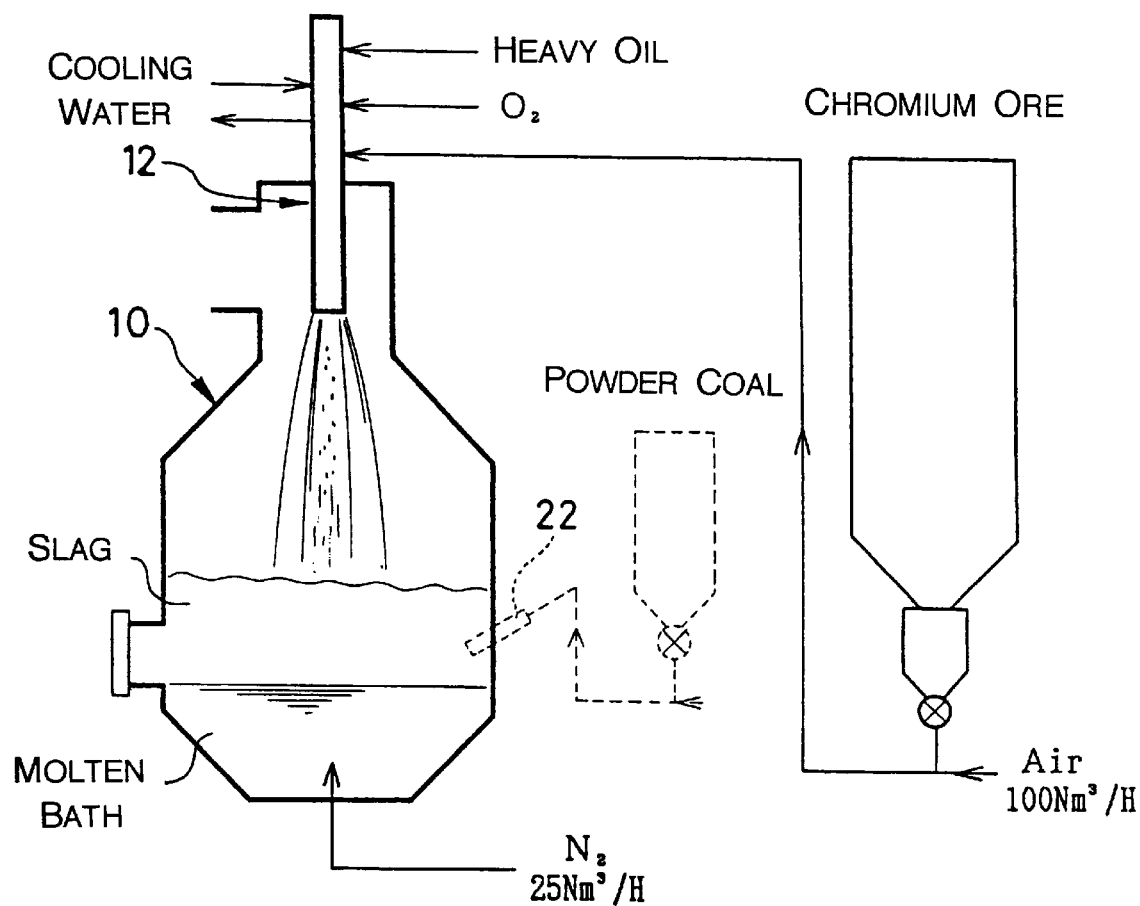
FIG. 5 is a schematic diagram of a further facility used in a further example of the present invention.

Using the apparatus illustrated in FIG. 5, after charging CaO 600 kg and CaF$_2$ 150 kg and preheating, molten steel 10.5 T of the chemical composition shown in Table 12 was charged in the furnace 10.

TABLE 12

| Components | C | Cr | Mn | Ni | Si |
|---|---|---|---|---|---|
| wt. % | 4.3 | 0.05 | 0.21 | 0.04 | 0.08 |

To the molten steel chromium ore having the chemical composition shown in Table 13 was added.

TABLE 13

| Components | Cr$_2$O$_3$ (T.Cr) | FeO (T.Fe) | MgO | Al$_2$O$_3$ | C |
|---|---|---|---|---|---|
| wt. % | 46 (31.5) | 26 (20.2) | 10 | 16 | 0.02 |

The ore was pulverized to such fine powder that 92% passes a 200 mesh sieve, and the powder was injected through the oxygen burner 12 into the furnace to melt under the conditions shown in Table 14.

TABLE 14

| Heavy Oil | 800 liters/hour |
|---|---|
| 02 | 1600 Nm$^3$/hour |
| Powdered Chromium Ore | 2.5 T/hour |

At the same time N$_2$ gas was bubbled from the furnace bottom to stir the molten bath. Temperature of the molten steel just prior to injecting and melting the chromium ore was 1480° C.

The above operation continued for one hour to melt and reduce the chromium ore, and then the molten slag and the molten metal were separately tapped.

Chemical composition of the molten metal (steel) was as shown in Table 15, and the amount of the molten metal was 11.7 T. Temperature of the molten metal was 1560° C.

TABLE 15

| Components | C | Cr | Mn | Ni | Si |
|---|---|---|---|---|---|
| wt. % | 0.3 | 6.5 | 0.18 | 0.02 | <0.01 |

On the other hand, the slag amounted to about 1.9 T, with the chemical composition as shown in Table 16.

TABLE 16

| Components | Cr$_2$O$_3$ | T.Fe | CaO | MgO | Al$_2$O$_3$ |
|---|---|---|---|---|---|
| wt. % | 1.8 | 0.2 | 40 | 22 | 32 |

In this example, based on the amounts and compositions of the molten steel charged and discharged it is concluded that, using C in the molten steel as the reducing agent, molten metal 1.2 T was obtained.

In a modified embodiment of this example in which carbonaceous material was blown into the slag bath as illustrated with a broken line in FIG. 5, i.e., under supply of the reducing agent, metal in the reduced state was continuously obtained. In this embodiment coal powder was used as the carbonaceous material. From a comparison of the case where the coal powder was blown in the molten slag bath and the case where it was blasted on the slag surface it was found that the former gave a better slag reduction percentage.

Some working examples have been explained above in detail. It should be understood that the examples are only for exemplification and that the invention could be carried out with various modifications in the spirit of the invention.

We claim:

1. A process for obtaining a metal from dust waste from a steel making process, comprising supplying said dust waste containing one or more metal oxides into a high temperature flame burner in a reactor furnace having a single chamber to heat and melt the dust waste, supplying a reducing agent into the reactor furnace to cause reducing reaction of the one or more metal oxides contained in said dust waste, and recovering the resulting metal in a reduced state.

2. A process for obtaining a metal from a metal oxide according to claim 1; wherein the burner used is an oxygen burner or an oxygen-enriched gas burner.

3. A process for obtaining a metal from a metal oxide according to claim 1; wherein the metal oxide particles are supplied by being injected from the nozzles of the burner into the high temperature flame along the axis of the flame for heating and melting.

4. A process for obtaining a metal from a metal oxide according to claim 1; wherein the reducing agent is used in the form of particles having such sizes that they do not completely burn out in the high temperature flame, and wherein the reducing agent particles are supplied from nozzles of the burner into the high temperature flame.

5. A process for obtaining a metal from a metal oxide according to claim 1; wherein the molten metal oxide resulting from heating and containing the reducing agent is placed in the reactor furnace for completion of the reducing reaction.

6. A process for obtaining a metal from a metal oxide according to claim 1; wherein the reducing agent is applied by being blown into the molten metal oxide bath with a carrier gas.

7. A process for obtaining a metal from a metal oxide according to claim 1; wherein the ratio of the fuel to the oxygen supplied to the burner is so adjusted that the oxygen is insufficient for complete burning of the fuel and forms a reducing flame rich in CO so as to accelerate the reducing reaction under the reducing atmosphere.

8. A process for obtaining a metal from a metal oxide according to claim 1; wherein the reducing reaction is accelerated by blowing a stirring gas into the molten metal oxide in the reactor furnace.

9. A process for obtaining a metal from a metal oxide according to claim 8; wherein a reducing gas is used as the stirring gas.

10. A process for obtaining a metal from a metal oxide according to claim 1; wherein heat necessary for the reducing reaction is supplemented by a heating means other than the burner.

11. A process for obtaining a metal from a metal oxide according to claim 9; wherein the reducing gas is selected from the group consisting of $CH_4$, $H_2$ and CO.

12. A process for obtaining a metal from a metal oxide according to claim 9; wherein the heating means is selected from the group consisting of arc heating, induction heating and reaction heat of CO in the molten metal oxide.

* * * * *